United States Patent
Kawakami et al.

(10) Patent No.: US 10,999,648 B2
(45) Date of Patent: May 4, 2021

(54) COMMAND PROCESSING SERVER, COMMAND PROCESSING PROGRAM, COMMAND PROCESSING SYSTEM, COMMAND EXECUTION PROGRAM AND COMMAND PROCESSING METHOD

(71) Applicant: DWANGO Co., Ltd., Tokyo (JP)

(72) Inventors: Nobuo Kawakami, Tokyo (JP); Hiroaki Saito, Tokyo (JP); Takashi Kojima, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/609,570

(22) PCT Filed: Nov. 20, 2018

(86) PCT No.: PCT/JP2018/042757
§ 371 (c)(1),
(2) Date: Oct. 30, 2019

(87) PCT Pub. No.: WO2019/102979
PCT Pub. Date: May 31, 2019

(65) Prior Publication Data
US 2020/0389709 A1    Dec. 10, 2020

(30) Foreign Application Priority Data
Nov. 27, 2017 (JP) .............................. JP2017-226711

(51) Int. Cl.
*H04N 7/10* (2006.01)
*H04N 7/025* (2006.01)
(Continued)

(52) U.S. Cl.
CPC ....... *H04N 21/812* (2013.01); *H04N 7/17318* (2013.01); *H04N 21/25891* (2013.01);
(Continued)

(58) Field of Classification Search
CPC combination set(s) only.
See application file for complete search history.

(56) References Cited

U.S. PATENT DOCUMENTS

| 10,735,821 B1* | 8/2020 | Lewis ................. H04N 21/858 |
| 2007/0028272 A1* | 2/2007 | Lockton ............ H04N 21/4758 |
| | | 725/62 |

(Continued)

FOREIGN PATENT DOCUMENTS

| JP | 2015-139078 A | 7/2015 |
| JP | 6219548 B1 | 10/2017 |

OTHER PUBLICATIONS

Translation of International Search Report and Written Opinion dated Dec. 18, 2018 in corresponding application No. PCT/JP2018/042757; 9 pgs.
(Continued)

*Primary Examiner* — Mulugeta Mengesha
(74) *Attorney, Agent, or Firm* — Maier & Maier, PLLC

(57) ABSTRACT

The purpose of this disclosure is to reduce viewer dissatisfaction caused by delays in communication, processing or the like in a system in which a server relays data reception and transmission between a terminal used by a distributor and a terminal used by a viewer. A command processing server which is connected to a command issuing terminal and a command executing terminal comprises: a reception unit which receives a command pertaining to a command execution terminal from a command issuing terminal; a notification unit which notifies the command execution terminal that a command has been received; and an execution instruction unit which transmits, to the command execution terminal, an instruction to execute a command on a command execution terminal, after the command execution terminal has been notified that a command has been received.

7 Claims, 4 Drawing Sheets

(51) Int. Cl.
*H04N 21/81* (2011.01)
*H04N 7/173* (2011.01)
*H04N 21/258* (2011.01)
*H04N 21/472* (2011.01)
*H04N 21/4788* (2011.01)
*H04N 21/6547* (2011.01)

(52) U.S. Cl.
CPC ... *H04N 21/4788* (2013.01); *H04N 21/47202* (2013.01); *H04N 21/6547* (2013.01)

(56) References Cited

U.S. PATENT DOCUMENTS

2016/0315998 A1   10/2016  Johnson et al.
2018/0160180 A1*  6/2018  Kedenburg, III .. H04N 21/4758

OTHER PUBLICATIONS

Notice of Reasons for Refusal dated Aug. 21, 2018 in corresponding application No. 2017-226711, 6 pgs.
Decision to Grant a Patent dated Nov. 6, 2018 in corresponding application No. 2017-226711, 5 pgs.

\* cited by examiner

COMMAND PROCESSING SERVER, COMMAND PROCESSING PROGRAM, COMMAND PROCESSING SYSTEM, COMMAND EXECUTION PROGRAM AND COMMAND PROCESSING METHOD

FIELD

The present invention relates to a command processing server connected to a command issuing terminal and a command execution terminal, a command processing program, a command processing system with the command processing server, a command execution program used for the command processing system and a command processing method.

BACKGROUND

In recent years, there has been an extensive popularization of content providing services for streaming videos to various terminals such as personal computers, tablet terminals, portable terminals including smartphones, television receivers and game machines. The content providing service provides a service that allows a video viewer to post a comment such as a video impression as an example of a reaction to the video being viewed.

The content providing service distributes a video and comments posted by multiple viewers to terminals used by the viewers. The terminal superimposes and displays the comments on the distributed video. While watching the video, the viewers can enjoy comments exchanged with other users who watched the video.

In addition, it is possible to provide live broadcasting in which the server distributes a video data distributed from a terminal used by a distributor to a terminal used by the viewer in real-time. In such a content providing service, it is possible for the distributor and the viewer to share videos and comments in real-time. Further, in such a content providing service, the distributor may issue a command pertaining to the terminal owned by the viewer and lead the terminal owned by the viewer to execute the command through the server.

In general, in order to achieve a remote conference through a network, there is a system in which a first terminal participating in the remote conference sends materials to a second terminal participating in the remote conference, and the acquisition shows the notice of completion that the second terminal has received the materials (Patent Literature 1).

Patent Literature 1: Japanese Patent Publication No. 2017-68530

SUMMARY

However, a delay may occur in communication, processing or others when the server relays data transmission and reception between the terminal used by the distributor and the terminal used by the viewer. If a delay occurs in a system in which the distributor and the viewer share a video and a comment in real-time, there is a discrepancy between the video and the comment, and the content may not be appropriately distributed. Particularly, when the distributor issues a command on the terminal owned by the viewer and if the execution of the command by the viewer is delayed, it may not be clear whether the delay was occurred in the issuance of the command by the distributor or the delay was due to the communication or the processing, and therefore, the viewer may feel dissatisfied.

According to the system described in Patent Literature 1, it depends on the notification of the acquisition that the recipient has obtained the materials, and participants of the remote conference only have to wait for the notification until the notification is complete, and as a result, the participants may be dissatisfied.

Therefore, in a system which the server relays data transmission and reception between a terminal used by the distributor and a terminal used by the viewer, an object of the present invention is to provide a command processing server, a command processing program, a command processing system, a command execution program and a command processing method that reduce viewers' dissatisfaction caused by delays in communication, processing or others.

In order to achieve the object of the invention, a first aspect of the invention relates to a command processing server connected to a command issuing terminal and a command execution terminal. The command processing server according to the first aspect of the invention comprises a reception unit receiving a command pertaining to the command execution terminal from the command issuing terminal, a notification unit notifying to the command execution terminal that the command has been received, and an execution instruction unit transmitting instructions for executing the command on the command execution terminal to the command execution terminal after notifying to the command execution terminal that the command has been received.

The command processing server may execute a process necessary to transmit an instruction for executing the command to the command execution terminal after notifying the command execution terminal that the command has been received.

The command issuing terminal may be used by the distributor distributing video data, the command execution terminal may be used by the viewer viewing the video data, and the command may be an instruction from the distributor to the viewer on the video data. The command is the instruction to superimpose a screen related to a survey of the distributor conducting to the viewer on the video data.

A second aspect of the invention relates to a command processing program used for a computer connected to the command issuing terminal and the command execution terminal. The command processing program according to the second aspect operates the computer to function as a reception unit receiving a command pertaining to the command execution terminal from the command issuing terminal, a notification unit notifying to the command execution terminal that the command has been received, and an execution instruction unit transmitting instructions for executing the command on the command execution terminal to the command execution terminal after notifying to the command execution terminal that the command has been received.

A third aspect of the invention relates to a command processing system including the command issuing terminal, the command execution terminal, and the command processing server connected to the command issuing terminal and the command execution terminal. In the command processing system according to the third aspect of the invention, the command issuing terminal includes a command issuing unit transmitting a command pertaining to the command execution terminal. The command processing server includes a reception unit receiving a command pertaining to the command execution terminal from the command issuing terminal, a notification unit notifying to the command execution terminal that the command has been received, and an execution instruction unit transmitting instructions for executing the command on the command execution terminal to the command execution terminal after notifying to the command execution terminal that the command has been received. The command execution terminal includes a notification processing unit that outputs that the command has been received when receiving the notification from the command processing server that the command has been received and a command execution unit that receives the instruction for executing the command from the command processing server and executes the command.

A fourth aspect of the invention relates to a command execution program used for the command execution terminal in the command processing system including the command issuing terminal, the command execution terminal, and the command processing server connected to the command issuing terminal and the command execution terminal. The command execution program according to the fourth aspect operates the command execution terminal which is a computer to function as a notification processing unit outputting from the command processing server that the command has been received when receiving the notification from the command issuing terminal to the command processing server that the command pertaining to the command execution terminal has been received and a command execution unit receiving the instruction for executing the command on the command execution terminal from the command processing server and executing the command.

A fifth aspect of the invention relates to a command processing method used in the command processing system including the command issuing terminal, the command execution terminal, and the command processing server connected to the command issuing terminal and the command execution terminal. The command processing method according to the fifth aspect of the invention includes a step of the command issuing terminal transmitting a command pertaining to the command execution terminal, a step of the command processing server receiving the command pertaining to the command execution terminal from the command issuing terminal, a step of the command processing server notifying to the command execution terminal that the command has received, a step of the command execution terminal outputting that the command has been received when notified that the command from the command processing server has been received, a step of the command processing server transmitting an instruction for executing the command on the command execution terminal to the command execution terminal after notifying to the command execution terminal that the command has been received, and a step of the command execution terminal receiving the instruction for executing the command from the command processing server and executing the command.

According to the present invention, in a system which the server relays data transmission and reception between a terminal used by the distributor and a terminal used by the viewer, it is possible to provide a command processing server, a command processing program, a command processing system, a command execution program and a command processing method that reduce viewers' dissatisfaction caused by delays in communication, processing or others.

DETAILED DESCRIPTION

Figure 1:
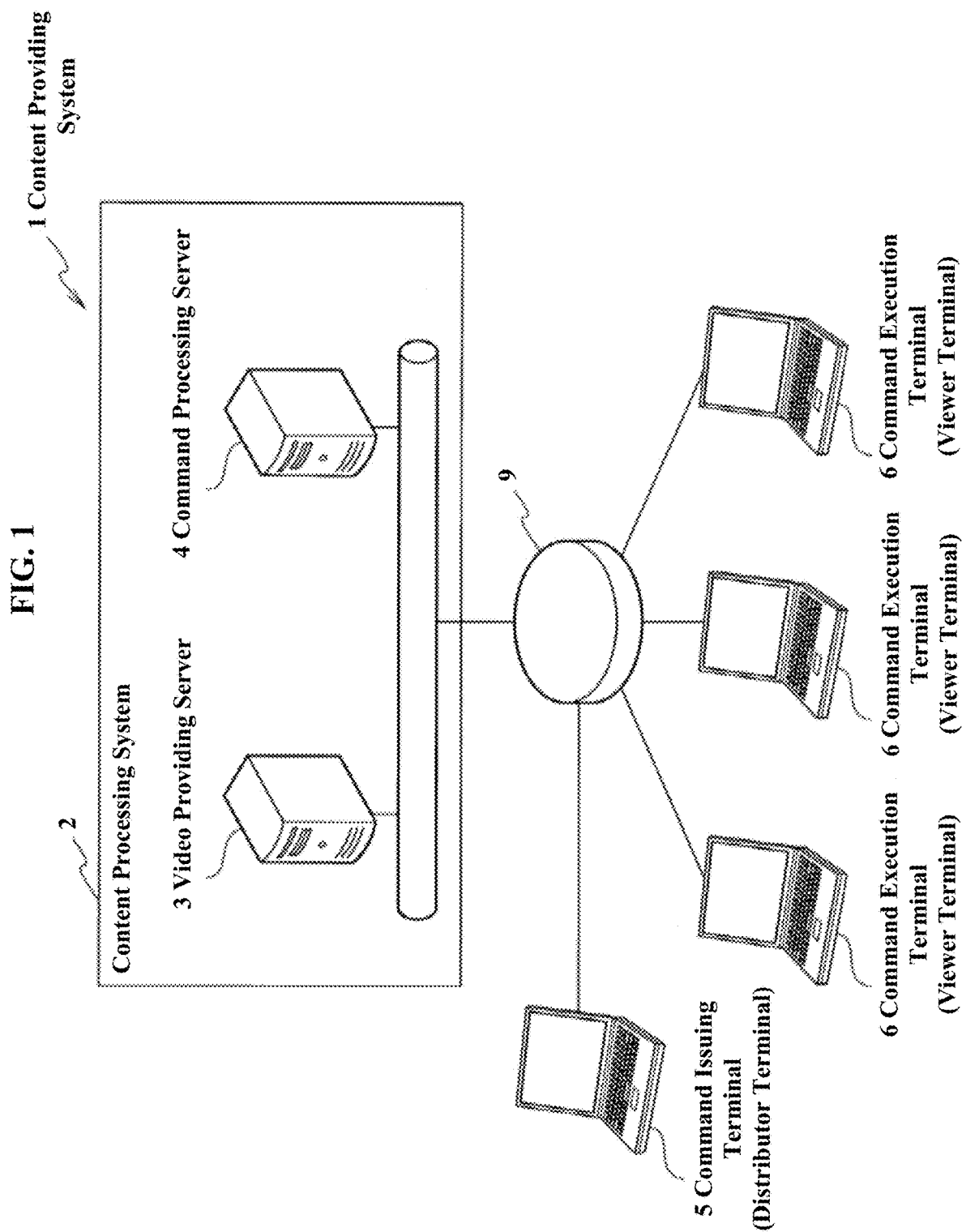
FIG. 1 is an explanatory diagram of a system configuration of a command processing system according to an embodiment of the invention.

Next, an embodiment of the invention will be described while referring to the drawings. In the descriptions of the drawings hereinafter, the same or similar reference numerals will be applied to the same or similar elements.

In the embodiment of the invention, "post" is data input to communicate with other users. In some cases, "post" may be referred to as "comment."

In the embodiment of the invention. "real-time." in addition to cases in which time exactly matches in the precise meaning, includes cases where processing is instantly performed on each device in which permitting some cases where delays associated with transmission or processing occur.

(Content Providing System)

A content providing system 1 (a command processing system) according to the embodiment of the invention will be described while referring to FIG. 1. The content providing system 1 allows the distributor and the viewer to share the video and the comment in real-time. The content providing system 1 includes a content processing system 2, a command issuing terminal 5 and a command execution terminal 6. The content processing system 2, the command issuing terminal 5 and the command execution terminal 6 are communicably connected with each other through a communication network 9 such as the internet. The content processing system 2 includes a video providing server 3 and a command processing server 4.

In the embodiment of the invention, a content is described as a case of providing video data and a service associated with providing video data, however, it is not limited to this embodiment. Examples of providing a service associated with providing video data include sharing a post input by a viewer of the video data and a survey conducted on the viewer.

The command issuing terminal 5 is a terminal used by the distributor distributing video data. The command issuing terminal 5 generates video data and provides it to the content providing system 1. The video data may further include audio data. Moreover, the command issuing terminal 5 issues a command pertaining to the command execution terminal 6 for the service associated with providing the video and transmits the command to the content providing system 1.

The command execution terminal 6 is a terminal used by the viewer viewing video data distributed by the command issuing terminal 5. The command execution terminal 6 replays the video data received from the content providing system 1. Further the command execution terminal 6 receives an instruction for executing the command issued by the command issuing terminal 5 from the content providing system 1 and executes the command according to the instruction.

In the content processing system 2, the video providing server 3 distributes the video data provided by the command issuing terminal 5 to the command execution terminal 6 used by the viewer. Further, the command processing server 4 leads the command execution terminal 6 to execute the command issued by the command issuing terminal 5 pertaining to the service associated with the video data.

A command herein is an instruction from the distributor to the viewer on video data and relates to a service associated with the video data. An example of the service associated with the video data is a display of posting data superimposed on a playback screen of the video data. For instance, the command processing server 4 may control to superimpose the posting data input by a certain viewer on the playback screen of the video data of each user so that users (distributors and viewers) viewing the same video data can share in their terminals.

Further, the service associated with the video data includes, for example, a survey that the distributor conducts on the viewer, and the command is the instruction that superimposes a screen related to the survey conducted by the distributor to the viewer on the video data viewed by the viewer. The command issuing terminal 5 transmits an indication of a survey set by the distributor and a command with the survey queries and answer options to the command processing server 4. The command processing server 4 displays a survey screen on the terminal of each viewer, leads the survey to be answered and instructs the command execution terminal 6 to return the input answer to the command processing server 4. The command execution terminal 6 displays the survey queries and the answer options according to the instruction from the command processing server 4, selects one of the options and transmits the selected option to the command processing server 4. The command processing server 4 collects the options selected in each command execution terminal 6 and displays the collected result on the command issuing terminal 5 and the command execution terminal 6. The survey queries and the answer options displayed on the command execution terminal 6 and the collected result displayed on the command issuing terminal 5 and the command execution terminal 6 are superimposed on the video distributed by the command issuing terminal 5 and displayed with a predetermined transmittance.

The command processing server 4 transmits and receives data between the distributor terminal and the viewer terminal of the video as described above, and therefore, the data may not be transmitted and received in real-time due to a delay of the command processing server 4. Thus, the command processing server 4 according to the embodiment of the invention notifies the command execution terminal that the command has been received when receiving the command pertaining to the command execution terminal 6 from the command issuing terminal 5. Further, the command processing server 4 transmits an instruction for executing the command on the command execution terminal 6 to the command execution terminal 6 after notifying the command execution terminal 6 that the command has been received.

Figure 2:
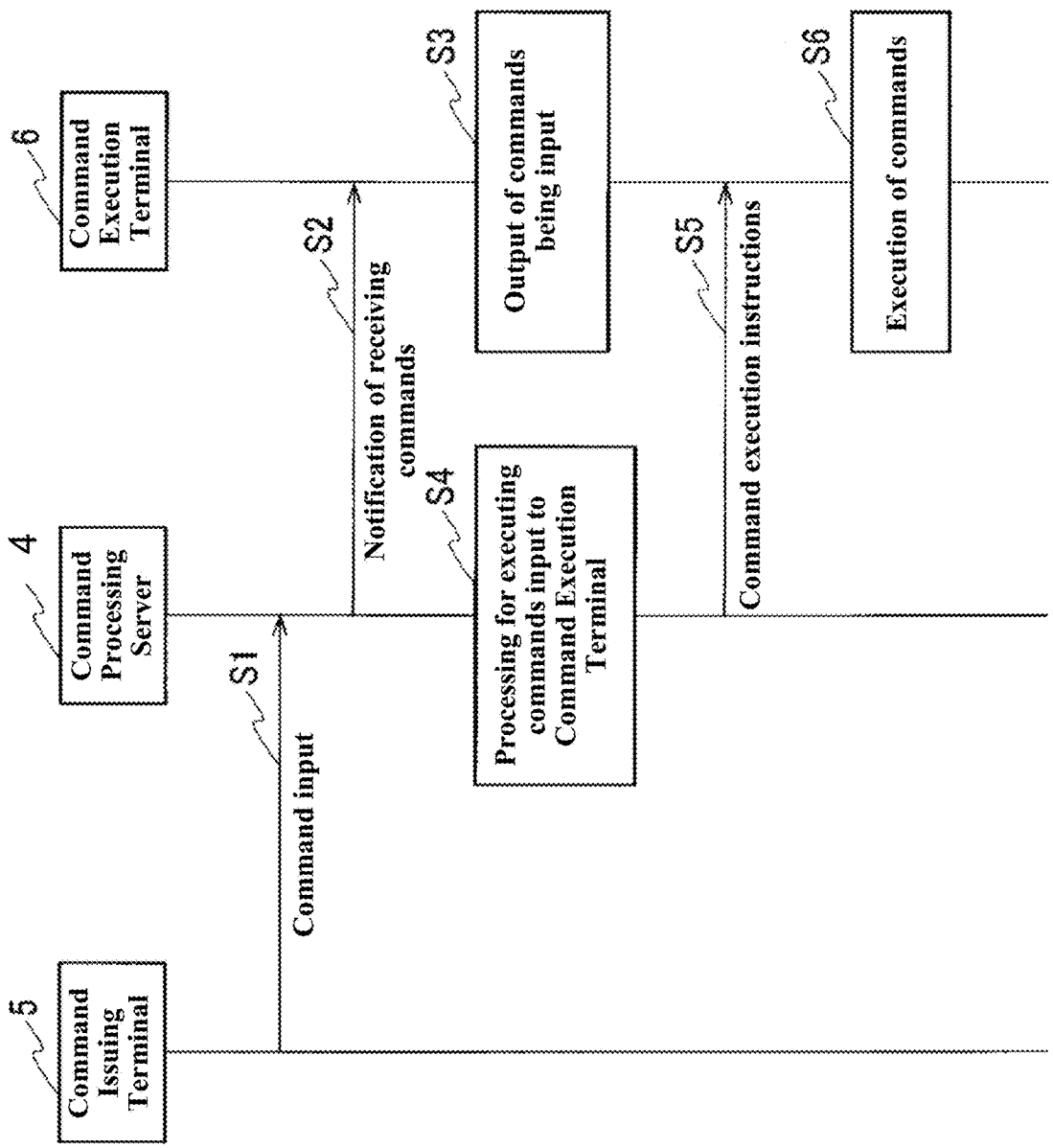
FIG. 2 is a sequence diagram explaining a command processing method according to the embodiment of the invention.

A command processing method according to the embodiment of the invention will be described while referring to FIG. 2.

Figure 3:
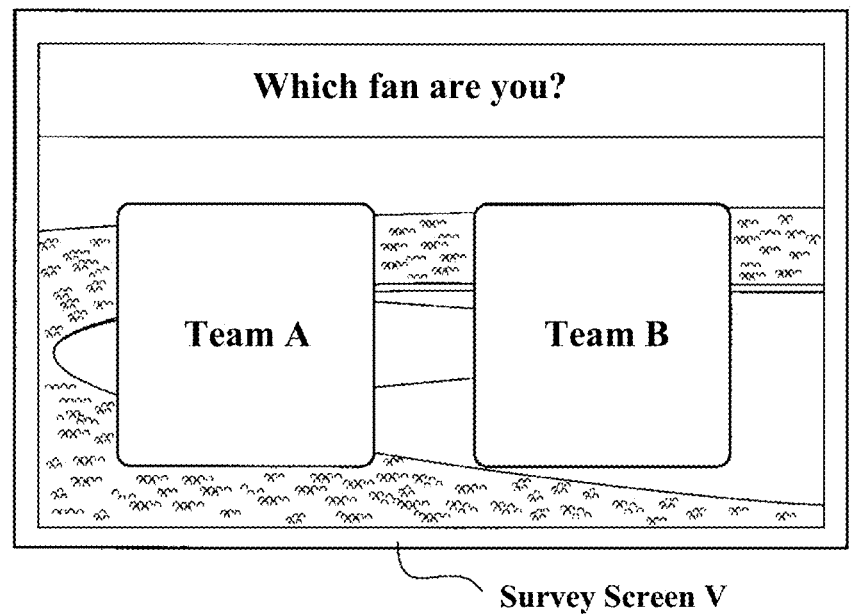
FIG. 3 is a diagram illustrating an example of a screen displayed in a command execution terminal according to the embodiment of the invention.

First, in a step S1, the command issuing terminal 5 transmits the command input by the distributor to the command processing server 4. For example, when the survey screen V as shown in FIG. 3 is displayed on the command execution terminal, the command issuing terminal 5 transmits the indication of conducting a survey and the command including the survey queries, "Which fan are you?" and the answer options, "Team A" and "Team B," to the command processing server 4.

In a step S2, the command processing server 4 first notifies the command execution terminal 6 that the command has been received from the command issuing terminal 5. In a step S3, the command execution terminal 6 outputs that the command has been input on the command issuing terminal 5 and notifies the viewer. The command execution terminal 6 may display, for example, "Server is processing the command," or may display an icon or an animation indicating that the server is processing the command.

In a step S4, the command processing server 4 performs processing for executing the command received in the step S1 to the execution terminal 6 after notifying that the command has been received in the step S2. The command processing server 4 performs processing for displaying the survey screen V as shown in FIG. 3 on the viewer terminal. When the load is high to be processed immediately here, the command processing server 4 places the step S4 processing in a queue, stands by for the processing order, and performs the processing when processable.

When the step S4 processing is completed, in a step S5, the command processing server 4 instructs the command execution terminal 6 to execute the command along with the result of the step S4 processing. In a step S6, the command execution terminal 6 executes the command received in the step S5. The command execution terminal 6 may erase the notification displayed in the step S3 and display that the command is processing in the execution terminal 6 by showing the loading, such as an icon or an animation. When the process in the command execution terminal 6 is completed, the survey screen V as shown in FIG. 3 is displayed on the command execution terminal 6.

According to the foregoing command processing method of the embodiment of the invention, the command processing server 4 immediately notifies the command execution terminal 6 that the command has been received when receiving the command from the command issuing terminal 5. Even when the process on the command processing server 4 may be delayed, the viewer of the command execution terminal 6 can recognize that the command has been issued by the distributor and the process is in progress on the server, resulting in the reduction of the stress of waiting for the command execution.

The command processing method according to the embodiment of the invention is suitable for live broadcasting in which the distributor distributes a video in real-time and progresses a program while watching the viewer's posts.

Generally, for example, after the distributor distributes a video speaking, "I am going to ask everyone a survey now" and if the survey is not displayed on the viewer's terminal, the viewer may rush the distributer by inputting a post, for instance. "Is there the survey yet?" Such a post is not directly related to the progress of the program, and therefore, it may be difficult for the distributor to progress the program as intended.

Accordingly, in the embodiment of the invention, by notifying the viewer that the distributor has input the command pertaining to the survey, the viewer recognizes a reason that the survey is not displayed is because of a delay due to the command processing server 4 or the communication network, not because of the distributor. Therefore, in the embodiment of the invention, the viewer does not rush the distributor by posting, "Is there the survey yet?" so that the program can be progressed by the distributor without interfering and it is possible for the distributor to progress the program as intended.

In the content providing system 1 according to the embodiment of the invention, even when a delay is generated by a device or a communication circumstance, it is possible to clarify that at least the delay is not associated with the distributor, resulting in the reduction of the viewer dissatisfaction while waiting.

In the embodiment of the invention, the command issuing terminal 5 is described as a case of providing video data and issuing a command pertaining a service associated with providing the video data, however, it is not limited to this embodiment. The function achieved by the command issuing terminal 5 may be conducted by a plurality of terminals. Moreover, in the example shown in FIG. 1, a case where the content providing system 1 includes one command issuing terminal 5 and three command execution terminals 6 is described, however, it is not limited to this embodiment. The number of the command execution terminals 6 may be one or more.

In the embodiment of the invention, a case where the terminal distributing the video has issued the command pertaining to the service associated with providing the video and the terminal viewing the video has executed the command has been described, however, it is not limited to this embodiment. The terminal viewing the video may issue a command pertaining to a service associated with providing the video and may lead the other terminals to execute the command. For example, in a case of the service displaying a post input by the viewer on the terminal used by the distributor, the command issuing terminal 5 becomes the terminal viewing the video and the command execution terminal 6 becomes the terminal distributing the video. In the embodiment of the invention, the distributor conducting a survey on the viewers is described, however, the invention may be applied to a case where one of the viewers conducts a survey to other viewers and the distributor.

(Command Processing Server)

Figure 4:
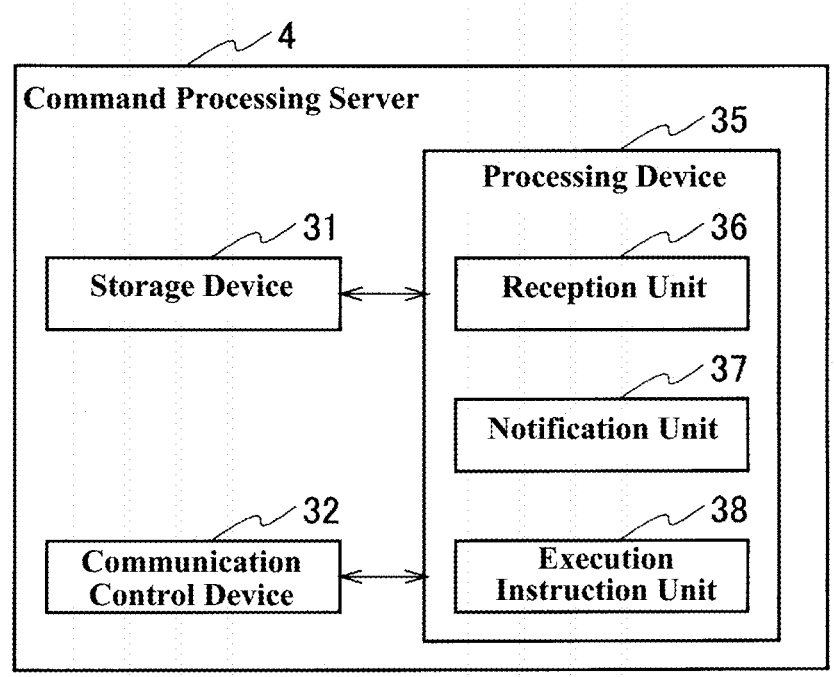
FIG. 4 is an explanatory diagram of a hardware configuration and a functional block of a command processing server according to the embodiment of the invention.

As shown in FIG. 4, the command processing server 4 is a general computer having a storage device 31, a communication control device 32 and a processing device 35. Each function shown in FIG. 4 is achieved by executing the command processing program for accomplishing a predetermined function of the general computer.

The storage device 31 may be a ROM (Read Only Memory), a RAM (Random Access Memory), a hard disk or other storage media which stores various data such as a program executed by the processing device 35, input data for the processing device 35 to execute processing, output data and intermediate data. The communication control device 32 is an interface for transmitting and receiving data to and from other devices through a communication network. The processing device 35 is a CPU (Central Processing Unit) and executes processing on the command processing server 4 by reading and executing a program stored in the storage device 31, reading and writing data stored in the storage device 31 or outputting and inputting data to and from the communication control device 32.

The processing device 35 includes a reception unit 36, a notification unit 37 and an execution instruction unit 38.

The reception unit 36 receives a command pertaining to the command execution terminal 6 from the command issuing terminal 5.

The notification unit 37 notifies the command execution terminal 6 that the command has been received from the command issuing terminal 5. It is preferable that the notification unit 37 notifies the command execution terminal 6 immediately after the reception unit 36 receives the command. Since the notifying process that the command has been received is not a heavy load on the command processing server 4, it is possible to promptly notify to the command execution terminal 6.

The notification unit 37 herein specifies the destination of the command execution terminal 6 as needed. For example, when the distributor of the video data uses the command issuing terminal 5 and the viewer of the video data uses the command execution terminal 6, the notification unit 37 identifies the viewer specific information of the video data such as an IP address and notifies it to a specified information address.

After notifying the command execution terminal 6 that the command has been received, the execution instruction unit 38 transmits an instruction for executing the command on the command execution terminal 6 to the command execution terminal 6. It is preferable for the execution instruction unit 38 here to execute processing necessary to transmit the instruction for executing the command to the command execution terminal after notifying the command execution terminal 6 that the command has been received. Thus, the command processing server 4 can immediately notify the command execution terminal 6 that the command has been received, and it is possible to reduce the stress of the standby time of the user on the command execution terminal 6.

The command processing server 4 may notify the command execution terminal 6 that all the commands processed by the command processing server 4 have been received or may notify only some of the commands. It is also possible for the command processing server 4 to control to notify the command execution terminal 6 that the command has been received for the command requiring a long processing time or the command causing a delay and not to notify the command for which the processing does not take for a long time or a delay does not occur.

(Command Issuing Terminal)

Figure 5:
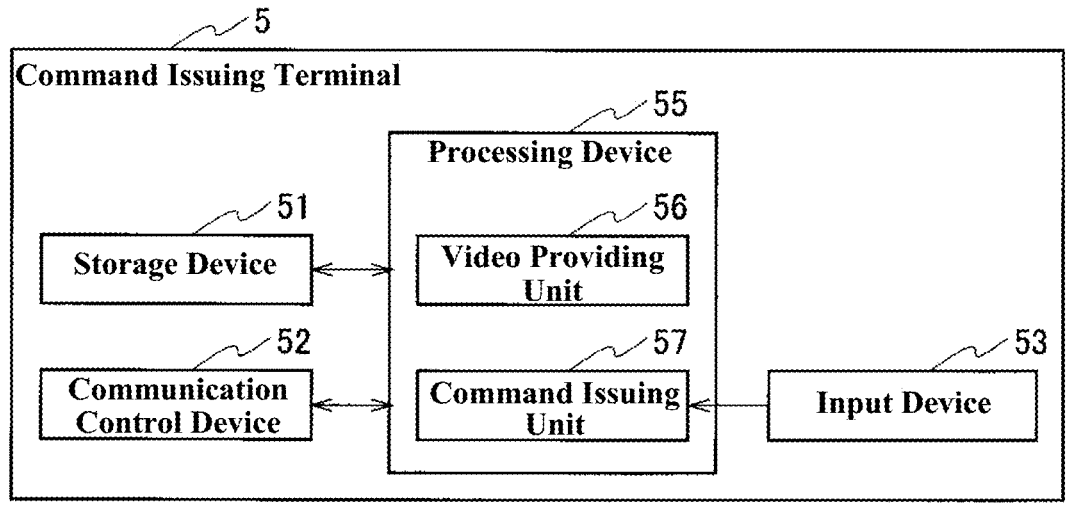
FIG. 5 is an explanatory diagram of a hardware configuration and a functional block of a command issuing terminal according to the embodiment of the invention.

As shown in FIG. 5, the command issuing terminal 5 is a general computer having a storage device 51, a communication control device 52, an input device 53 and a processing device 55. Each function shown in FIG. 5 is achieved by executing the command issuing program for accomplishing a predetermined function of the general computer.

The storage device 51, the communication control device 52 and the processing device 55 are the same as the respective devices of the command processing server 4 described with reference to FIG. 4. The input device 53 is an interface for inputting a command to lead the command execution terminal 6 to execute, and specifically, is a keyboard, a mouse or an equivalent input device.

The processing device 55 includes a video providing unit 56 and a command issuing unit 57.

The video providing unit 56 provides the video data recorded or generated by the distributor to the video providing server 3 through the communication network 9. The video data provided to the video providing server 3 is provided to the command execution terminal 6.

The command issuing unit 57 transmits a command pertaining to the command execution terminal 6. For example, when conducting a survey to the viewer on providing video data is desired, the distributor inputs an information necessary for conducting the survey through the input device 53. The command issuing unit 57 transmits the information input by the input device 53 to the command processing server 4 through the communication control device 52.

(Command Execution Terminal)

Figure 6:
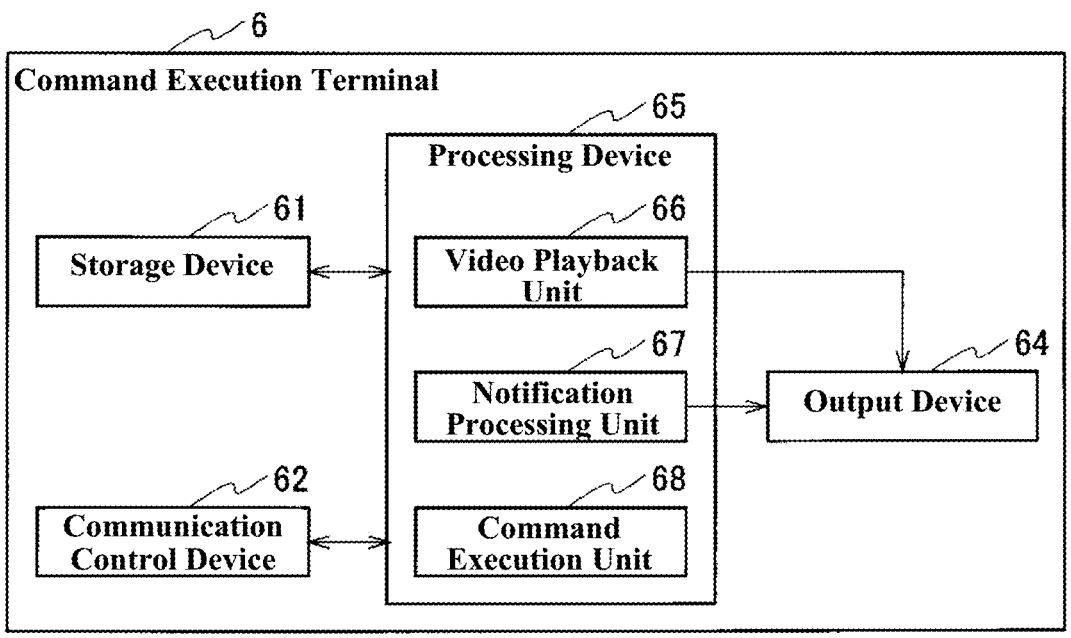
FIG. 6 is an explanatory diagram of a hardware configuration and a functional block of the command execution terminal according to the embodiment of the invention.

As shown in FIG. 6, the command execution terminal 6 is a general computer having a storage device 61, a communication control device 62, an output device 64 and a processing device 65. Each function shown in FIG. 6 is achieved by executing the command execution program for accomplishing a predetermined function of the general computer.

The storage device 61, the communication control device 62 and the processing device 65 are the same as the respective devices of the command processing server 4 described with reference to FIG. 4. The output device 64 is an interface for outputting an execution result by the command execution terminal 6 to have the viewer recognize, and specifically, is a display or an equivalent output device.

The processing device 65 includes a video playback unit 66, a notification processing unit 67 and a command execution unit 68.

The video playback unit 66 replays the video data distributed by the command issuing terminal 5 and provided by the video providing server 3.

The notification processing unit 67 outputs that the command has been received when receiving a notification from the command processing server 4 that the command has been received. The notification processing unit 67 displays a message, an image, an animation, or similar displays, indicating that the command processing server 4 is processing the command.

The command execution unit 68 receives an instruction for executing the command from the command processing server 4 and executes the command. For example, when an instruction to display a survey screen is received, the command execution unit 68 displays the survey screen according to the received instruction. Further, if a message, an image, an animation or similar displays indicating that the command processing server 4 is processing the command is displayed, the command execution unit 68 deletes this display and displays a message, an image, an animation or similar displays that the command execution terminal 6 is executing the command as needed.

According to the embodiment of the invention, in a system which the server relays data transmission and reception between the terminal used by the distributor and the terminal used by the viewer, it is possible to reduce the viewer dissatisfaction caused by delays in communication, processing or others.

(Other Embodiments)

Although the embodiment of the invention has been described as above, the foregoing description and accompanying drawings are a part of the disclosure and should not be construed as being the limitation of the invention. According to the disclosure, variations of the alternative embodiments, examples and operations technologies will be apparent to those skilled in the art.

The invention certainly includes various embodiments that are not discussed herein. Accordingly, the technical scope of the invention should be defined only by matters specified in the invention according to the appropriate scope of claims from the foregoing description.

The invention claimed is:

1. A command processing server which is connected to a command issuing terminal and a command execution terminal, the command processing comprising:
   a reception unit which receives a command pertaining to the command execution terminal from the command issuing terminal;
   a notification unit which notifies the command execution terminal that the command has been received; and
   an execution instruction unit which transmits instructions for executing the command on the command execution terminal to the command execution terminal, wherein:
   the execution instruction unit transmits instructions only after the notification unit notifies the command execution terminal;
   the command issuing terminal is used by a distributor distributing video data;
   the command execution terminal is used by a viewer viewing the video data; and
   the command is an instruction from the distributor to the viewer on the video data.

2. The command processing server according to claim 1, wherein:
   the command processing server executes a process necessary for the execution instruction unit to transmit instructions after the notification unit notifies the command execution terminal.

3. The command processing server according to claim 1, wherein:
   the command is an instruction to superimpose a screen related to a survey of the distributor conducting to the viewer on the video data.

4. A non-transitory computer readable storage medium storing a command processing program comprising:
   a command processing program used for a computer connected to a command issuing terminal and a command execution terminal wherein the computer functions as:
   a reception unit which receives a command pertaining to the command execution terminal from the command issuing terminal;
   a notification unit which notifies the command execution terminal that the command has been received; and
   an execution instruction unit which transmits instructions for executing the command on the command execution terminal to the command execution terminal, wherein:
   the execution instruction unit transmits instructions only after the notification unit notifies the command execution terminal;
   the command issuing terminal is used by a distributor distributing video data;
   the command execution terminal is used by a viewer viewing the video data; and
   the command is an instruction from the distributor to the viewer on the video data.

5. A command processing system comprising:
   a command processing system which includes a command issuing terminal, a command execution terminal, and a command processing server connected to the command issuing terminal and the command execution terminal, wherein:
   the command issuing terminal comprises a command issuing unit transmitting a command pertaining to the command execution terminal;
   the command processing server comprises:

a reception unit which receives a command pertaining to the command execution terminal from the command issuing terminal, a notification unit which notifies the command execution terminal that the command has been received, and an execution instruction unit which transmits instructions for executing the command on the command execution terminal to the command execution terminal; and the command execution terminal comprises:

a notification processing unit which outputs that the command has been received by the command processing server after receiving a notification from the notification unit of the command processing server, and a command execution unit that receives an instruction for executing the command from the execution instruction unit of the command processing server and executes the command, wherein:

the execution instruction unit transmits instructions only after the notification unit notifies the command execution terminal;

the command issuing terminal is used by a distributor distributing video data;

the command execution terminal is used by a viewer viewing the video data; and the command is an instruction from the distributor to the viewer on the video data.

6. A non-transitory computer readable storage medium storing a command execution program comprising:

a command execution program used for a command execution terminal in a command processing system, the command processing system includes a command issuing terminal, the command execution terminal, and a command processing server connected to the command issuing terminal and the command execution terminal wherein:

the command execution terminal is a computer which functions as:

a notification processing unit which outputs that a command has been received by the command processing server after the notification processing unit receives a notification from the command processing server; and a command execution unit that receives an instruction for executing the command on the command execution terminal from the command processing server and executes the command, wherein:

the command execution unit receives the instruction only after the notification processing unit receives the notification;

the command issuing terminal is used by a distributor distributing video data;

the command execution terminal is used by a viewer viewing the video data; and the command is an instruction from the distributor to the viewer on the video data.

7. A command processing method comprising:

a command processing method used in a command processing system, the command processing system includes a command issuing terminal, a command execution terminal, and a command processing server connected to the command issuing terminal and the command execution terminal, the command processing method comprising:

a step of the command issuing terminal transmitting a command pertaining to the command execution terminal;

a step of the command processing server receiving the command pertaining to the command execution terminal from the command issuing terminal;

a step of the command processing server notifying to the command execution terminal that the command has received;

a step of the command execution terminal outputting that the command has been received when notified that the command from the command processing server has been received;

a step of the command processing server transmitting an instruction for executing the command on the command execution terminal to the command execution terminal only after notifying to the command execution terminal that the command has been received; and a step of the command execution terminal receiving the instruction for executing the command from the command processing server and executing the command, wherein:

the command issuing terminal is used by a distributor distributing video data;

the command execution terminal is used by a viewer viewing the video data; and the command is an instruction from the distributor to the viewer on the video data.

* * * * *